United States Patent
Li et al.

(10) Patent No.: US 12,404,190 B2
(45) Date of Patent: Sep. 2, 2025

(54) RESOURCE UTILIZATION-ORIENTED TREATMENT METHOD FOR SPENT ELECTROLESS NICKEL PLATING BATH

(71) Applicant: Dongjiang Environmental Company Limited, Guangdong (CN)

(72) Inventors: Shanting Li, Guangdong (CN); Kan Tan, Guangdong (CN); Wenbin Xu, Guangdong (CN); Yanhua Zhang, Guangdong (CN); Yongjun Xiao, Guangdong (CN); Xinglin Guo, Guangdong (CN); Long He, Guangdong (CN)

(73) Assignee: Dongjiang Environmental Company Limited, Shenzhen (CN)

( * ) Notice: Subject to any disclaimer, the term of this patent is extended or adjusted under 35 U.S.C. 154(b) by 164 days.

(21) Appl. No.: 17/918,369

(22) PCT Filed: Dec. 30, 2020

(86) PCT No.: PCT/CN2020/141208
§ 371 (c)(1),
(2) Date: Oct. 12, 2022

(87) PCT Pub. No.: WO2022/141147
PCT Pub. Date: Jul. 7, 2022

(65) Prior Publication Data
US 2023/0322593 A1 Oct. 12, 2023

(51) Int. Cl.
*C02F 1/66* (2023.01)
*C02F 1/52* (2023.01)
(Continued)

(52) U.S. Cl.
CPC .............. *C02F 1/66* (2013.01); *C02F 1/5245* (2013.01); *C02F 1/725* (2013.01);
(Continued)

(58) Field of Classification Search
None
See application file for complete search history.

(56) References Cited

FOREIGN PATENT DOCUMENTS

| CN | 101456637 A | 6/2009 |
|---|---|---|
| CN | 103073096 A | 5/2013 |

(Continued)

OTHER PUBLICATIONS

International Search Report of PCT/CN2020/141208.
Written Opinion of PCT/CN2020/141208.

*Primary Examiner* — Peter Keyworth

(57) ABSTRACT

The present disclosure relates to the field of resource utilization-oriented treatment technologies for wastewater, and more particularly, to a resource utilization-oriented treatment method for a spent electroless nickel plating bath. The method includes oxidation de-complexation, synchronous precipitation of nickel and phosphorus, secondary precipitation of nickel, and resource utilization of sodium salt. In the present disclosure, in a reaction process, no sludge is generated to avoid secondary pollution to the environment. Further, the present disclosure has the advantages of short flow and less chemical use, greatly reducing treatment costs. In this way, this method is a low-cost and clean resource utilization-oriented treatment method capable of achieving resource utilization-oriented recovery of nickel, phosphorus, sodium, sulfate radical, or chlorine in the spent electroless nickel plating bath.

9 Claims, 1 Drawing Sheet

(51) Int. Cl.
  *C02F 1/72* (2023.01)
  *C02F 101/20* (2006.01)
  *C02F 103/16* (2006.01)
(52) U.S. Cl.
  CPC ...... *C02F 2101/20* (2013.01); *C02F 2103/16* (2013.01); *C02F 2209/02* (2013.01); *C02F 2209/05* (2013.01); *C02F 2209/06* (2013.01); *C02F 2209/44* (2013.01); *C02F 2305/026* (2013.01)

(56) References Cited

FOREIGN PATENT DOCUMENTS

| | | | |
|---|---|---|---|
| CN | 105329988 | A | 2/2016 |
| CN | 106186427 | A | 12/2016 |
| CN | 108083563 | A | 5/2018 |
| CN | 108503103 | A | 9/2018 |

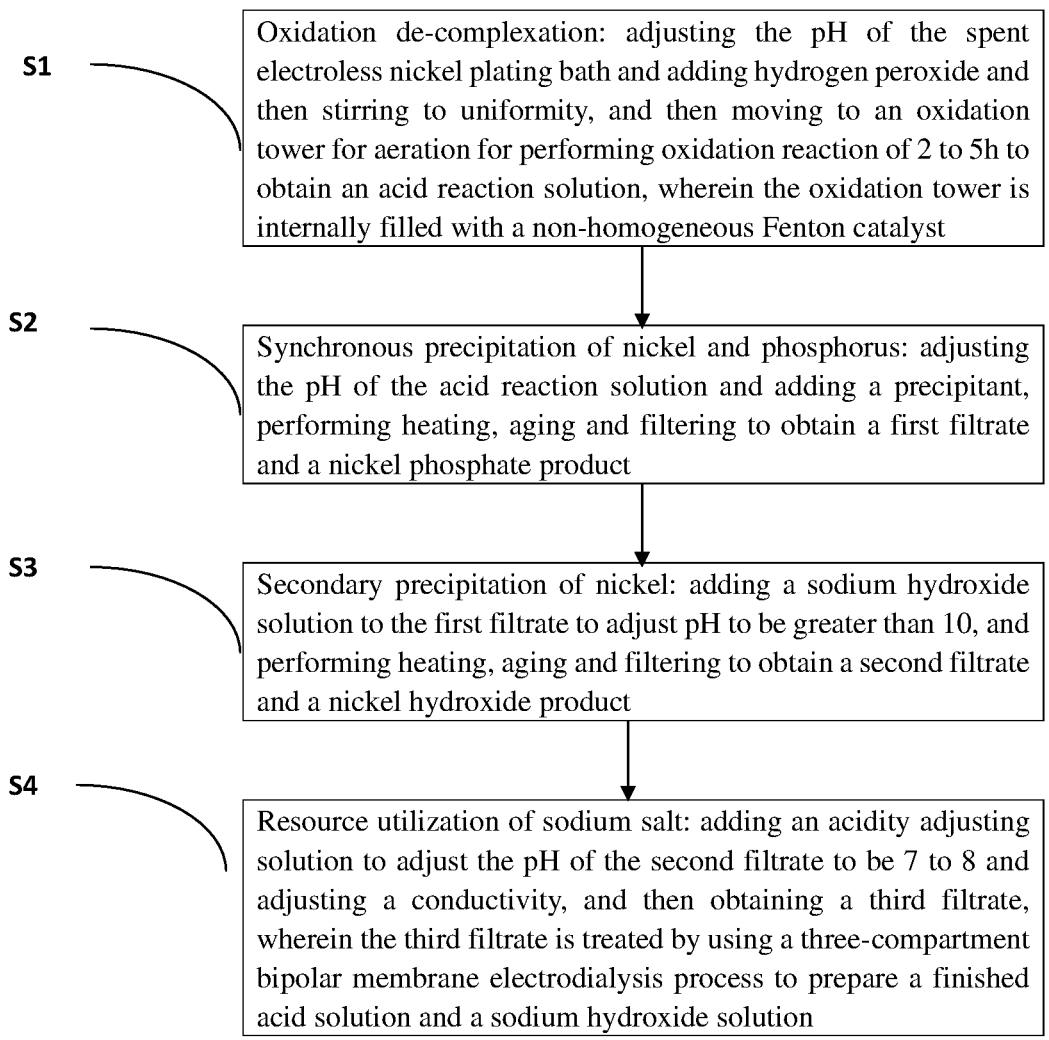

RESOURCE UTILIZATION-ORIENTED TREATMENT METHOD FOR SPENT ELECTROLESS NICKEL PLATING BATH

CROSS-REFERENCE TO RELATED APPLICATION

This Application is a national stage application of PCT/CN2020/141208. This application claims priority from PCT Application No. PCT/CN2020/141208, filed Dec. 30, 2020, the content of which is incorporated herein in the entirety by reference.

TECHNICAL FIELD

The present disclosure relates to the field of resource utilization-oriented treatment technologies, and more particularly to a resource utilization-oriented treatment method for a spent electroless nickel plating bath.

BACKGROUND

Electroless nickel plating has become a major surface treatment technology due to the advantages of its plating layer in the aspects such as uniformity, corrosion resistance, and wear resistance and is widely applied in the fields such as electronic products, aerospace, and machine manufacturing. During an electroless nickel plating process, as a redox reaction proceeds continuously, the accumulation of by-products such as phosphite will lead to aging of the plating bath, forming a large amount of spent electroless nickel plating bath.

The main ingredients in the spent electroless nickel plating bath are $Na^+$, $H_2PO_2^-$, $HPO_3^{2-}$, $PO_4^{3-}$, $SO_4^{2-}$ (or $Cl^-$), free $Ni^{2+}$, complex nickel, and organic substance. At present, in the industry, much research is focused on the recovery of nickel resources and removal of total phosphorus, and COD pollution factors and few comprehensive disposal solutions are proposed.

The nickel resource recovery method includes a catalytic reduction method and an electrolysis method. In the catalytic reduction method, a reductant and an aid, for example, sodium borohydride, sodium hypophosphite, or the like are added. However, this process increases the concentration of the spent bath and complicates the property of the spent bath, which increases processing difficulty and, subsequently, costs. The electrolysis method can directly recover the elementary substance nickel, but the spent bath contains less nickel and the electrolysis takes a longer time with higher energy consumption. The COD and total phosphorus are mainly removed by an oxidation precipitation method. Current common oxidation methods include $Ca(ClO)_2$, Fenton oxidation, ultraviolet Fenton oxidation, and the like. These methods are disadvantageous because a large amount of sludge containing phosphorus and nickel is produced during the treatment process. Further, the introduction of new pollution factors increases treatment difficulty. In general, the spent electroless nickel plating bath has a very complex property and is very difficult to treat.

In conclusion, the current resource utilization-oriented treatment methods for a spent electroless nickel plating bath have the following problems.

(1) A large amount of sludge containing phosphorus, nickel, and iron is produced, which greatly increases treatment costs; the introduction of a large number of new pollution factors increases the treatment difficulty of the spent electroless nickel plating bath.

(2) The spent electroless nickel plating bath is very complex in property, high in concentration, and difficult to treat. A large number of treatment chemicals is also required, increasing costs.

SUMMARY

To address the above problems, the present disclosure provides a resource utilization-oriented treatment method for a spent electroless nickel plating bath. In this method, no sludge will be produced in the treatment process of the spent electroless nickel plating bath, thus preventing secondary pollution. Further, the method features a short process flow and less chemical use, which greatly reduces treatment costs. Therefore, this method is a low-cost and clean resource utilization-oriented treatment method capable of achieving resource utilization-oriented recovery of nickel, phosphorus, sodium, sulfate radical, or chlorine in the spent electroless nickel plating bath.

The above technical object of the present disclosure can be achieved by the following technical solution. There is provided a resource utilization-oriented treatment method for a spent electroless nickel plating bath, which includes the following steps:

step S1, oxidation de-complexation: adjusting the pH of the spent electroless nickel plating bath and adding hydrogen peroxide and then stirring to uniformity, and then moving to an oxidation tower for aeration for performing an oxidation reaction of 2 to 5 h to obtain an acid reaction solution, where the oxidation tower is internally filled with a non-homogeneous Fenton catalyst, a mass concentration of hydrogen peroxide is 25% to 40%, and a use amount of hydrogen peroxide is 10% to 15% of a mass of the spent electroless nickel plating bath;

step S2, synchronous precipitation of nickel and phosphorus: adjusting the pH of the acid reaction solution and adding a precipitant, performing heating, aging, and filtering to obtain a first filtrate and a nickel phosphate product;

step S3, secondary precipitation of nickel: adding a sodium hydroxide solution to the first filtrate to adjust pH to be greater than 10, and performing heating, aging and filtering to obtain a second filtrate and a nickel hydroxide product;

step S4, resource utilization of sodium salt: adding an acidity adjusting solution to adjust the pH of the second filtrate to be 7 to 8 and adjusting a conductivity, and then obtaining a third filtrate, where the third filtrate is treated by using a three-compartment bipolar membrane electrodialysis process to prepare a finished acid solution and a sodium hydroxide solution.

The spent electroless nickel plating bath contains complex nickel in addition to $Na^+$, $H_2PO_2^{31}$, $HPO_3^{2-}$, $PO_4^{3-}$, $SO_4^{2-}$ (or $Cl^-$), free $Ni^{2+}$, and organic substances. In the present disclosure, instead of using the conventional Fenton oxidation combination of hydrogen peroxide and ferrous sulfate, hydrogen peroxide and non-homogeneous Fenton catalyst are used to perform oxidation for the spent electroless nickel plating bath, such that the organic substances in the spent electroless nickel plating bath are degraded to reduce the COD of the spent bath, where the complex nickel is subjected to thorough oxidation de-complexation to change into a free nickel ion while hypophosphite and phosphite therein are oxidized to orthophosphate. In this treatment process, no sludge will be produced, which avoids secondary pollution to the environment. After the oxidation reaction ends, an acid reaction solution can be obtained. A precipitant is added to the acid reaction solution to completely remove the element phosphorus in the reaction solution and precipitate some of the nickel ions. After addition, heating and aging are performed to realize full reaction and make suspended solids and precipitates therein re-coagulated and fully precipitated. After aging, the precipitates are filtered to obtain a first filtrate and a nickel phosphate product. The first filtrate is added with a sodium hydroxide solution to fully precipitate the remaining nickel ions in the filtrate. After addition, heating, aging, and filtering are performed to obtain a second filtrate and a nickel hydroxide product. The second filtrate is added with an acidity-adjusting solution to adjust pH and then adjusted for conductivity and then filtered to obtain a third filtrate. A sodium salt in the third filtrate is treated by using a three-compartment bipolar membrane electrodialysis process to obtain, through recovery, a finished acid solution, and a sodium hydroxide solution.

Preferably, in step S1, the pH of the spent electroless nickel plating bath is adjusted to 5 to 6, and a substance for adjusting the pH of the spent electroless nickel plating bath is an acid solution or a sodium hydroxide solution; when cathode ions in the spent electroless nickel plating bath are $H_2PO_2^-$, $HPO_3^{2-}$, $PO_4^{3-}$ and $SO_4^{2-}$, the acid solution is sulfuric acid; when the cathode ions in the spent electroless nickel plating bath are $H_2PO_2^-$, $HPO_3^{2-}$, $PO_4^{3-}$ and $Cl^-$ the acid solution is hydrochloric acid. Adjusting the pH of the spent electroless nickel plating bath to be weak acidity can effectively increase the stability of hydrogen peroxide and the catalytic activity of the non-homogeneous catalyst. Under an appropriate pH environment, the spent electroless nickel plating bath can be more fully oxidized.

Preferably, in step S1, the non-homogeneous Fenton catalyst includes a carrier and a catalytic component, where the carrier is a porous composite material and the catalytic component is a precious metal, a rare earth metal oxide, and a transition metal oxide.

Preferably, in step S2, the pH of the acid reaction solution is adjusted to 7 to 8, a mass concentration of the precipitant is 15% to 30%, and the precipitant is used in such an amount that a total phosphorus concentration in the first filtrate is lower than 0.5 mg/L.

Preferably, when the cathode ions in the spent electroless nickel plating bath are $H_2PO_2^-$, $HPO_3^{2-}$, $PO_4^{3-}$ and $SO_4^{2-}$, the precipitant is a nickel sulfate solution; when the cathode ions in the spent electroless nickel plating bath are $H_2PO_2^-$, $HPO_3^{2-}$, $PO_4^{3-}$ and $Cl^-$, the precipitant is a nickel chloride solution; and its reaction principle is $Ni^{2+}+PO_4^{3-}=Ni_3(PO_4)_2\downarrow$, where $K_{sp}(25°C.)$ of $Ni_3(PO_4)_2=5\times10^{-31}$.

Preferably, in step S2, the heating temperature is 70° C. and the aging time is 0.5 h to 1 h. The aging process aims to enable the reaction to fully proceed, and enable suspended solids and small-granule precipitates in the reaction solution to be formed into a large-granule precipitate by coagulation or the like and then precipitated.

Preferably, in step S3, a mass concentration of sodium hydroxide is 10% to 15%, and the sodium hydroxide solution is used in such an amount that a nickel concentration of the second filtrate is lower than 0.1 mg/L. Its reaction principle is $Ni_{2+}+OH^-=Ni(OH)_2\downarrow$, where $K_{sp}(25°C.)$ of $Ni(OH)_2=2.0\times10^{-15}$.

Preferably, in step S3, the heating temperature is 70° C. and the aging time is 1 h to 2 h.

Preferably, in step S4, when the cathode ions in the spent electroless nickel plating bath are $H_2PO_2^-$, $HPO_3^{2-}$, $PO_4^{3-}$ and $SO_4^{2-}$, the acidity adjusting solution is sulfuric acid, and the conductivity is adjusted to 70 to 110 mS/cm; when the cathode ions in the spent electroless nickel plating bath are $H_2PO_2^-$, $HPO_3^{2-}$, $PO_4^{3-}$ and $Cl^-$, the acidity adjusting solution is hydrochloric acid, and the conductivity is adjusted to 120 to 200 mS/cm.

Preferably, in step S4, the three-compartment bipolar membrane electrodialysis process is performed by an electrodialysis device, and the electrodialysis device includes a salt compartment, an acid compartment, and a base compartment. The acid compartment and the base compartment both are added with de-ionized water, and the salt compartment is added with the third filtrate. When the cathode ions in the spent electroless nickel plating bath are $H_2PO_2^-$, $HPO_3^{2-}$, $PO_4^{3-}$ and $SO_4^{2-}$, the third filtrate is a sodium sulfate solution; when the cathode ions in the spent electroless nickel plating bath are $H_2PO_2^-$, $HPO_3^{2-}$, $PO_4^{3-}$ and $Cl^-$, the third filtrate is a sodium chloride solution.

In the implementation of the three-compartment bipolar membrane electrodialysis process, a volume ratio of the sodium sulfate solution or the sodium chloride solution added to the salt compartment to the de-ionized water added to the acid compartment to the de-ionized water added to the base compartment is 1: (0.5-2): (0.5-2). A finished acid solution is prepared in the acid compartment and a sodium hydroxide solution is prepared in the base compartment, where the concentration of the sodium hydroxide solution is 8% to 13%. When the cathode ions in the spent electroless nickel plating bath are $H_2PO_2^-$, $HPO_3^{2-}$, $PO_4^{3-}$ and $SO_4^{2-}$, the finished acid solution is a sulfuric acid solution with a concentration of 10% to 15%; when the cathode ions in the spent electroless nickel plating bath are $H_2PO_2^-$, $HPO_3^{2-}$, $PO_4^{3-}$ and $Cl^-$, the finished acid solution is a hydrochloric acid solution with a concentration of 8% to 12%. When the concentration of the sodium hydroxide solution is greater than 13%, de-ionized water is replenished in the base compartment to lower the concentration. When the concentration of the sulfuric acid solution is greater than 15% or the concentration of the hydrochloric acid solution is greater than 12%, de-ionized water is replenished to the acid compartment to lower the concentration. Finally, the prepared finished acid solution or sodium hydroxide solution is used for pH adjustment in steps S1, S2, and S4 or secondary precipitation of nickel in step S3.

In conclusion, the present disclosure has the following beneficial effects.

Firstly, according to the present disclosure, resource utilization-oriented treatment for nickel, phosphorus, sodium, sulfate radical, or chlorine in the spent electroless nickel plating bath can be achieved to change the wastes into valuable things. The method features a short process flow and less chemical use. During the treatment process, no new pollution factors are introduced and no sludge is produced. Thus, the method is a low-cost and clean resource utilization-oriented treatment process.

Secondly, according to the present disclosure, hydrogen peroxide is used to perform oxidation treatment in cooperation with the non-homogeneous Fenton catalyst while oxidation de-complexation and oxidation of hypophosphite and phosphite proceed synchronously, shortening the oxidation process. Finally, the organic substances in the spent bath are thoroughly oxidized to $CO_2$ and $H_2O$, and hypophosphite and phosphite are completely oxidized to orthophosphate.

Thirdly, according to the present disclosure, Fenton oxidation is performed by using hydrogen peroxide in cooperation with the non-homogeneous Fenton catalyst instead of using ferrous sulfate and hydrogen peroxide, such that no sludge containing iron is produced. In this way, a basic solution used for the precipitation of iron ions and the costs for subsequent iron sludge treatment can be saved.

Fourthly, according to the present disclosure, a precipitant nickel sulfate or nickel chloride is used to precipitate phosphate radical, nickel, and phosphorus in the form of nickel phosphate at the same time, to completely remove the element phosphorus in the spent nickel plating bath and generate a high purity nickel phosphate product capable of being recycled for resource utilization.

Fifthly, according to the present disclosure, resource utilization-oriented treatment is finally performed for a sodium salt solution by using the three-compartment bipolar membrane electrodialysis process to generate a finished acid solution or a sodium hydroxide solution usable for previous treatment steps, thus effectively reducing the costs.

BRIEF DESCRIPTIONS OF THE DRAWINGS

FIG. 1 shows a process flowchart of the present disclosure.

DETAILED DESCRIPTIONS OF EMBODIMENTS

The present disclosure will be further described in detail in combination with the specific embodiments. It should be noted that the embodiments described hereunder are intended to help understand the present disclosure rather than limit the present disclosure. Unless otherwise stated, all technical and scientific terms used herein have the same meaning that persons of ordinary skill in the art can understand. In case of any contradiction, the definitions of the specification shall prevail.

The term "prepared by . . . " used herein has the same meaning as "containing". The terms "containing", "including", "having", "with" and any other variations thereof used herein are intended to cover a non-exclusive inclusion. For example, compositions, steps, methods, products, or apparatuses including a series of elements are not necessarily limited to these elements but may include other elements not listed clearly or the elements inherent to the compositions, steps, methods, products, or apparatuses.

The conjunction "consist of" excludes any unlisted elements, steps, or components. If used in the claims, the phrase will make the claims to be closed such that other materials than the materials described herein are not included, except for relevant conventional impurities. When the phrase "consists of" appears in a sub-sentence of the subject of the claims rather than immediately after the subject, it only limits the elements described in the sentence; other elements are not excluded from the entirety of the claims.

When equivalents, concentrations, or other values or parameters are expressed using a range, or preferred range, or a range defined by a series of upper limit preferred values and lower limit preferred values, it should be understood that all ranges formed by any pair of an upper limit or preferred value of any range and a lower limit or preferred value of any range are specifically disclosed, no matter whether such ranges are disclosed individually. For example, when a range of "1 to 5" is disclosed, the range described herein shall be interpreted as including the ranges of "1 to 4", "1 to 3", "1 to 2", "1 to 2 and 4 to 5", and "1 to 3 and 5". When a numerical range is described herein, the range is intended to include its end values and all integers and fractions within the range, unless otherwise stated.

Embodiment 1

In the spent electroless nickel plating bath obtained in this embodiment, pH was 4.5, a total nickel content was 6700 mg/L, a total phosphorus content was 70000 mg/L, a COD value was 102000 mg/L, a concentration of $Na^+$ was 35000 mg/L, and a concentration of $SO_4^{2-}$ was 71300 mg/L.

At step S1, oxidation de-complexation: 1.0 L of spent electroless nickel plating bath was measured and then added with a sodium hydroxide solution to adjust pH to 6, and then 175 g of hydrogen peroxide with a mass concentration of 40% was added and then stirred to uniformity and then added to an oxidation tower internally filled with a non-homogeneous Fenton catalyst for aeration for performing oxidation reaction of 5 h to obtain an acid reaction solution.

At step S2, synchronous precipitation of nickel and phosphorus: the pH of the acid reaction solution was detected as 4.4, and 10% sodium hydroxide solution was added to the acid reaction solution to adjust the pH to 7.5. Stirred at the speed of 200 rpm, 1.3 L of a nickel sulfate solution with a mass concentration of 30% was slowly added. After addition, the mixture was heated to 70° C. and aged for 1 h, and then filtered to obtain a precipitate of nickel phosphate and a first filtrate.

At step S3, secondary precipitation of nickel: stirred at the speed of 200 rpm, the first filtrate was added slowly with 90 ml of a sodium hydroxide solution with a mass concentration of 10%. After addition, the pH of the first filtrate was 11.37, and the first filtrate was heated to 70° C. and aged for 1 h and then filtered to obtain a precipitate nickel hydroxide product and 2.2 L of the second filtrate.

At step S4, resource utilization of sodium salt: 2 L of the second filtrate was measured and then added with a sulfuric acid solution with a mass concentration of 15% to adjust pH to 7, and then added with pure water for dilution and adjusted to a conductivity of 110 mS/cm, and then filtered with a 0.45 μm filtering membrane to obtain a third filtrate. The third filtrate is a sodium sulfate solution. A bipolar membrane electrodialysis process was performed for the third filtrate by using an electrodialysis device, where a three-compartment bipolar membrane reactor was used, the working parameters were the voltage 35.0V, the current 4.4 A, the working temperature 30° C., and the electrodialysis device included a salt compartment, an acid compartment and a base compartment. 2 L of the filtered third filtrate was added to the salt compartment and 1.2 L of de-ionized water was added to the acid compartment and the base compartment respectively. In a reaction process, the sodium hydroxide solution was prepared in the base compartment, and the sulfuric acid solution was prepared in the acid compartment. When the concentration of the sulfuric acid solution in the acid compartment was excessively high or the concentration of the sodium hydroxide solution in the base compartment was excessively high, de-ionized water was replenished to the acid compartment or the base compartment to control the concentration of the sodium hydroxide solution or the sulfuric acid solution. When the conductivity of the solution in the salt compartment was lowered to 20 mS/cm, the experiment was stopped, and the sulfuric acid solution and the sodium hydroxide solution were finally prepared. The obtained sulfuric acid solution and sodium hydroxide solution can be further used in steps S1, S2, and S4 for pH adjustment and step S3 for precipitation of nickel ions. After electrodialysis treatment, the sodium sulfate solution remaining in the salt compartment can be re-added to an electrodialysis process for cycling treatment.

Embodiment 2

In the spent electroless nickel plating bath obtained in this embodiment, pH was 3.7, a total nickel content was 5120 mg/L, a total phosphorus content was 41000 mg/L, a COD value was 65000 mg/L, a concentration of Na was 25800 mg/L, and a concentration of $SO_4^{2-}$ was 52300 mg/L.

The present embodiment differs from embodiment 1 in that: in step S1, the pH was adjusted to 5.5, the mass concentration of hydrogen peroxide was 27.5% and the mass of hydrogen peroxide was 150 g, and the oxidation reaction time was 3 h; in step S2, after full oxidation, the pH was 4.2 and adjusted to 7.8, the mass concentration of the nickel sulfate solution was 15%, the volume of the nickel sulfate solution was 1.7 L, and the aging time was 0.5 h; in step S3, the volume of the sodium hydroxide solution was 70 ml, and the pH was adjusted to 12.03 to obtain 2.6 L of the second filtrate; in step S4, 2.5 L of the second filtrate was taken, the conductivity was 90 mS/cm, the voltage was 25.0V, the current was 3.4 A, the working temperature was 35° C., and the volumes added to the salt compartment, the acid compartment and the base compartment were 2.5 L, 1.2 L, and 1.2 L respectively.

Embodiment 3

In the spent electroless nickel plating bath obtained in this embodiment, pH was 3.2, a total nickel content was 2030 mg/L, a total phosphorus content was 25000 mg/L, a COD value was 32000 mg/L, a concentration of $Na^+$ was 21600 mg/L, and a concentration of $SO_4^{2-}$ was 44500 mg/L.

The present embodiment differs from embodiment 1 in that: in step S1, the pH was adjusted to 5.5, the mass concentration of hydrogen peroxide was 27.5% and the mass of hydrogen peroxide was 108 g, and the oxidation reaction time was 2 h; in step S2, after full oxidation, the pH was 4.8, the mass concentration of the nickel sulfate solution was 15%, the volume of the nickel sulfate solution was 0.47 L, and the aging time was 0.5 h; in step S3, the volume of the sodium hydroxide solution was 80 ml, and the pH was adjusted to 11.85 to obtain 1.5 L of the second filtrate; in step S4, 1.5 L of the second filtrate was taken, the pH was adjusted to 7.8, the current was 4.0 A, the working temperature was 35° C., and the volumes added to the salt compartment, the acid compartment and the base compartment were 1.5 L, 0.8 L, and 0.8 L respectively.

Embodiment 4

The present embodiment differs from embodiment 1 in the followings.

In the spent electroless nickel plating bath obtained in this embodiment, pH was 6.5, a total nickel content was 5900 mg/L, a total phosphorus content was 25200 mg/L, a COD value was 76000 mg/L, a concentration of $Na^+$ was 46400 mg/L, and a concentration of was 32300 mg/L.

In step S1, the hydrochloric acid solution was added to adjust the pH to 6, the mass concentration of hydrogen peroxide was 30%, and the mass of hydrogen peroxide was 380 g; in step S2, after full oxidation, the pH was 5.8, the added precipitant was a nickel chloride solution with a mass concentration of 20% and a volume of 0.68 L; in step S3, the volume of the sodium hydroxide solution was 120 ml, the pH was adjusted to 11.6 to obtain 1.4 L of the second filtrate; in step S4, 1.0 L of the second filtrate which was a sodium chloride solution was taken, the pH was adjusted to 7 by using hydrochloric acid, the conductivity was 150 mS/cm, the working temperature was 20° C., and the volumes added to the salt compartment, the acid compartment and the base compartment were 1 L, 0.8 L and 0.8 L respectively. In a reaction process, the sodium hydroxide solution was prepared in the base compartment, and the hydrochloric acid solution was prepared in the acid compartment. When the concentration of the hydrochloric acid solution in the acid compartment was excessively high or the concentration of the sodium hydroxide solution in the base compartment was excessively high, de-ionized water was replenished to the acid compartment or the base compartment to control the concentration of the sodium hydroxide solution or the hydrochloric acid solution. When the conductivity of the sodium chloride solution in the salt compartment was lowered to 40 mS/cm, the experiment was stopped, and the hydrochloric acid solution and the sodium hydroxide solution were finally prepared.

Embodiment 5

The present embodiment differs from embodiment 1 in the followings.

In the spent electroless nickel plating bath obtained in this embodiment, pH was 5.3, a total nickel content was 2850 mg/L, a total phosphorus content was 49500 mg/L, a COD value was 88000 mg/L, a concentration of $Na^+$ was 66800 mg/L, and a concentration of $Cl^-$ was 29000 mg/L.

In step S1, the hydrochloric acid solution was added to adjust the pH to 5.3, the mass concentration of hydrogen peroxide was 30%, and the mass of hydrogen peroxide was 600 g; in step S2, after full oxidation, the pH was 4.8, the added precipitant was a nickel chloride solution with a mass concentration of 20% and a volume of 1.3 L; in step S3, the volume of the sodium hydroxide solution was 150 ml, the pH was adjusted to 12.8 to obtain 2 L of the second filtrate; in step S4, 2 L of the second filtrate which was a sodium chloride solution was taken, the pH was adjusted to 7 by using hydrochloric acid, the conductivity was 180 mS/cm, the working temperature was 20° C., and the volumes added to the salt compartment, the acid compartment and the base compartment were 2 L, 1.6 L and 1.6 L respectively. In a reaction process, the sodium hydroxide solution was prepared in the base compartment, and the hydrochloric acid solution was prepared in the acid compartment. When the conductivity of the sodium chloride solution in the salt compartment was lowered to 40 mS/cm, the experiment was stopped, and the hydrochloric acid solution and the sodium hydroxide solution were finally prepared.

The key raw materials, use amounts, concentrations, or reaction conditions of the embodiments 1 to 5 are shown in the table below.

| Used materials or reaction conditions | | | Embodiment 1 | Embodiment 2 | Embodiment 3 | Embodiment 4 | Embodiment 5 |
|---|---|---|---|---|---|---|---|
| Step S1 oxidation de-complexation | Adjust pH | | / | 6 | 5.5 | 5.5 | 6 | 5.3 |
| | Hydrogen peroxide | Mass concentration (%) | 40 | 27.5 | 27.5 | 30 | 30 |
| | | Mass (g) | 175 | 150 | 108 | 380 | 600 |

-continued

| Used materials or reaction conditions | | | Embodiment 1 | Embodiment 2 | Embodiment 3 | Embodiment 4 | Embodiment 5 |
|---|---|---|---|---|---|---|---|
| | Oxidation reaction | Time (h) | 5 | 3 | 2 | 5 | 5 |
| Step S2 synchronous precipitation of nickel and phosphorus | Acid reaction solution pH | / | 4.4 | 4.2 | 4.8 | 5.8 | 4.8 |
| | Adjust pH | / | 7.5 | 7.8 | 7.5 | 7.5 | 7.5 |
| | Precipitant (embodiments 1 to 3 are nickel sulfate, embodiments 4 to 5 are nickel chloride) | Mass concentration (%) | 30 | 15 | 30 | 20 | 20 |
| | | Volume (L) | 1.3 | 1.7 | 0.47 | 0.68 | 1.3 |
| | Aging | Time (h) | 1 | 0.5 | 0.5 | 1 | 1 |
| Step S3 secondary precipitation of nickel | Sodium hydroxide solution | Mass concentration (%) | 10 | 10 | 10 | 10 | 10 |
| | | Volume (mL) | 90 | 70 | 80 | 120 | 150 |
| | Adjust pH | / | 11.37 | 12.03 | 11.85 | 11.6 | 12.8 |
| | Obtain a second filtrate | Volume (L) | 2.2 | 2.6 | 1.5 | 1.4 | 2 |
| Step S4 resource utilization of sodium salt | Take the second filtrate | Volume (L) | 2 | 2.5 | 1.5 | 1 | 2 |
| | Adjust pH | / | 7 | 7 | 7.8 | 7 | 7 |
| | Conductivity | (mS/cm) | 110 | 90 | 110 | 150 | 180 |
| | Working parameters of electrodialysis device | Voltage (V) | 35.0 | 25.0 | 35.0 | 35.0 | 35.0 |
| | | Current (A) | 4.4 | 3.4 | 4.0 | 4.4 | 4.4 |
| | | Working temperature (°C) | 30 | 35 | 35 | 20 | 20 |
| | Salt compartment, acid compartment, and base compartment | Volume (L) | 2, 1.2, 1.2 | 2.5, 1.2, 1.2 | 1.5, 0.8, 0.8 | 1, 0.8, 0.8 | 2, 1.6, 1.6 |

The spent electroless nickel plating bath treated by the above treatment process of the present disclosure has the following test results.

The test data of various indexes of the embodiments 1 to 5

| Index name | | COD value (mg/L) | Phosphorus (mg/L) | Nickel (mg/L) | Nickel phosphate (wet basis) (g) | Nickel hydroxide (wet basis) (g) | Sulfuric acid solution | | Na+ (mg/L) | Sodium hydroxide solution | |
|---|---|---|---|---|---|---|---|---|---|---|---|
| | | | | | | | $SO_4^{2-}$ (mg/L) | Concentration (%) | Volume (L) | | Concentration (%) | Volume (L) |
| Embodiment 1 | Before treatment | 102000 | 70000 | 6700 | / | / | 71300 | / | / | 35000 | / | / |
| | After treatment | 870 | 0.42 | 0.07 | 550 | 14 | / | 13.5 | 1.5 | / | 9.8 | 1.9 |
| Embodiment 2 | Before treatment | 65000 | 41000 | 5120 | / | / | 52300 | / | / | 25800 | / | / |
| | After treatment | 560 | 0.36 | 0.03 | 306 | 10 | / | 14.7 | 1.3 | / | 12.3 | 1.3 |
| Embodiment 3 | Before treatment | 32000 | 25000 | 2030 | / | / | 44500 | / | / | 21600 | / | / |
| | After treatment | 530 | 0.44 | 0.05 | 196 | 13 | / | 14.5 | 0.9 | / | 11.8 | 0.95 |

-continued

| Index | name | COD value (mg/L) | Phosphorus (mg/L) | Nickel (mg/L) | Nickel phosphate (wet basis) (g) | Nickel hydroxide (wet basis) (g) | Cl⁻ (mg/L) | hydrochloric acid solution Concentration (%) | hydrochloric acid solution Volume (L) | Na⁺ (mg/L) | Sodium hydroxide solution Concentration (%) | Sodium hydroxide solution Volume (L) |
|---|---|---|---|---|---|---|---|---|---|---|---|---|
| Embodiment 4 | Before treatment | 76000 | 25200 | 5900 | / | / | 32300 | / | | 46400 | / | |
| | After treatment | 536 | 0.12 | 0.08 | 195 | 19 | / | 11.3 | 0.95 | / | 11.6 | 0.91 |
| Embodiment 5 | Before treatment | 88000 | 49500 | 2850 | / | / | 29000 | / | | 66800 | / | |
| | After treatment | 610 | 0.26 | 0.01 | 380 | 25 | / | 11.5 | 1.8 | / | 12 | 1.8 |

The above data shows that, in the spent electroless nickel plating bath treated by the above treatment process of the present disclosure, the COD value is lower than 870 mg/L, the phosphorus in the spent bath is lower than 0.44 mg/L, nickel is lower than 0.08 mg/L. The nickel phosphate product and the nickel hydroxide product are generated during recovery. Finally, the sulfuric acid solution (or hydrochloric acid) and the sodium hydroxide solution are recovered by the electrodialysis process. Therefore, the process of the present disclosure has a short flow and has the advantages of no sludge and less use of chemicals in the treatment process, thus effectively reducing the treatment cost of the spent electroless nickel plating bath. In this way, resource utilization-oriented recovery for nickel, phosphorus, sodium, sulfate radical, or chlorine can be achieved, changing the waste into valuable things. Thus, this method is a low-cost and clean resource utilization-oriented treatment process.

The preceding embodiments are merely illustrated to explain some features of the method of the present disclosure. The appended claims are intended to require a possibly wide scope that can be conceived of, and the embodiments shown in the present disclosure are demonstrated by the true test results of the applicant. Therefore, the applicant desires that the appended claims are not limited by the illustrative selection of the features of the present disclosure. Some numerical ranges used in the claims also include sub-ranges therein and the changes within these ranges shall be interpreted as covered by the appended claims in possible cases.

What is claimed is:

1. A resource utilization-oriented treatment method for a spent electroless nickel plating bath, comprising the following steps:
   at step S1, oxidation de-complexation: adjusting the pH of the spent electroless nickel plating bath and adding hydrogen peroxide and then stirring to uniformity, and then moving to an oxidation tower for aeration for performing oxidation reaction of 2 to 5 h to obtain an acid reaction solution, wherein the oxidation tower is internally filled with a non-homogeneous Fenton catalyst;
   at step S2, synchronous precipitation of nickel and phosphorus: adjusting the pH of the acid reaction solution and adding a precipitant, performing heating, aging, and filtering to obtain a first filtrate and a nickel phosphate product;
   at step S3, secondary precipitation of nickel: adding a sodium hydroxide solution to the first filtrate to adjust pH to be greater than 10, and performing heating, aging, and filtering to obtain a second filtrate and a nickel hydroxide product;
   at step S4, resource utilization of sodium salt: adding an acidity adjusting solution to adjust the pH of the second filtrate to be 7 to 8 and adjusting a conductivity, and then obtaining a third filtrate, wherein the third filtrate is treated by using a three-compartment bipolar membrane electrodialysis process to prepare a finished acid solution and a sodium hydroxide solution.

2. The resource utilization-oriented treatment method of claim 1, wherein, in step S1, the pH of the spent electroless nickel plating bath is adjusted to 5 to 6, and a substance for adjusting the pH of the spent electroless nickel plating bath is an acid solution or a sodium hydroxide solution; when cathode ions in the spent electroless nickel plating bath are $H_2PO_2^-$, $HPO_3^{2-}$, $PO_4^{3-}$, $SO_4^{2-}$, the acid solution is sulfuric acid; when the cathode ions in the spent electroless nickel plating bath are $H_2PO_2^-$, $HPO_3^{2-}$, $PO_4^{3-}$, Cl⁻, the acid solution is hydrochloric acid.

3. The resource utilization-oriented treatment method of claim 1, wherein, in step S1, the non-homogeneous Fenton catalyst includes a carrier and a catalytic component, wherein the carrier is a porous composite material and the catalytic component is a precious metal, a rare earth metal oxide, and a transition metal oxide.

4. The resource utilization-oriented treatment method of claim 1, wherein, in step S2, the pH of the acid reaction solution is adjusted to 0.7 to 8, a mass concentration of the precipitant is 15% to 30%, and the precipitant is used in such an amount that a total phosphorus concentration in the first filtrate is lower than 0.5 mg/L.

5. The resource utilization-oriented treatment method of claim 1, wherein, when cathode ions in the spent electroless nickel plating bath are $H_2PO_2^-$, $HPO_3^{2-}$, $PO_4^{3-}$ and $SO_4^{2-}$, the precipitant is a nickel sulfate solution; when the cathode ions in the spent electroless nickel plating bath are $H_2PO_2^-$, $HPO_3^{2-}$, $PO_4^{3-}$ and Cl⁻, the precipitant is a nickel chloride solution.

6. The resource utilization-oriented treatment method of claim 1, wherein, in step S2, the heating temperature is 70° C. and the aging time is 0.5 hour to 1 hour.

7. The resource utilization-oriented treatment method of claim 1, wherein, in step S3, the heating temperature is 70° C. and the aging time is 1 hour to 2 hours.

8. The resource utilization-oriented treatment method of claim 1, wherein, in step S4, when cathode ions in the spent electroless nickel plating bath are $H_2PO_2^-$, $HPO_3^{2-}$, $PO_4^{3-}$, $SO_4^{2-}$, the acidity adjusting solution is sulfuric acid, and the conductivity is adjusted to 70 to 110 mS/cm; when the cathode ions in the spent electroless nickel plating bath are $H_2PO_2^-$, $HPO_3^{2-}$, $PO_4^{3-}$, $Cl^-$, the acidity adjusting solution is hydrochloric acid, and the conductivity is adjusted to 120 to 200 mS/cm.

9. The resource utilization-oriented treatment method of claim 1, wherein, in step S4, the three-compartment bipolar membrane electrodialysis process is performed by an electrodialysis device, the electrodialysis device comprises a salt compartment, an acid compartment, and a base compartment, the acid compartment and the base compartment both are added with de-ionized water, and the salt compartment is added with the third filtrate; when cathode ions in the spent electroless nickel plating bath are $H_2PO_2^-$, $HPO_3^{2-}$, $PO_4^{3-}$, $SO_4^{2-}$, the third filtrate is a sodium sulfate solution; when the cathode-ions in the spent electroless nickel plating bath are $H_2PO_2^-$, $HPO_3^{2-}$, $PO_4^{3-}$, $Cl^-$, the third filtrate is a sodium chloride solution.

\* \* \* \* \*